Patented Apr. 8, 1930

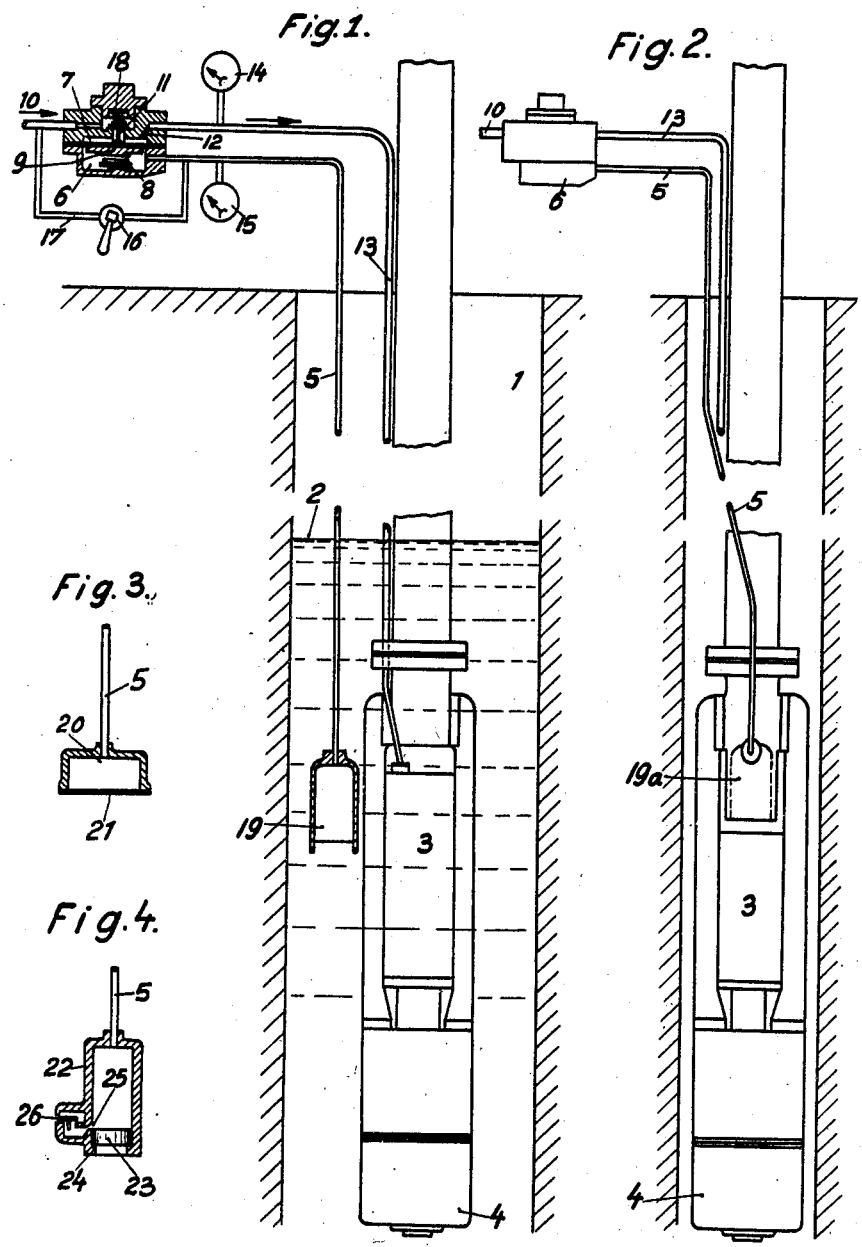

1,753,625

UNITED STATES PATENT OFFICE

HARRY SAUVEUR, OF HANOVER-WULFEL, GERMANY

REGULATOR FOR CONTROLLING FLUID PRESSURE IN SUBMERGED MACHINES

Application filed December 20, 1927, Serial No. 241,439, and in Germany August 11, 1927.

My invention relates to a regulator for controlling fluid pressure in submerged machines, and it is an object of my invention to obviate the necessity of arranging such regulators at, or substantially at, the same level as the machine.

To this end, instead of a regulator arranged at that level, as described in my co-pending U. S. application No. 213,180, filed August 15, 1927, I provide an air vessel which is connected with the regulator so that the regulator may be arranged in any convenient position with respect to the machine.

As described in my said co-pending application, the object of the regulator is to maintain the fluid pressure in the machine at a small constant excess pressure with respect to the varying head of liquid, as in a well the liquid level of which is subject to variations. The regulator may be arranged within the casing of the machine and the fluid pressure of which it is to control, or outside the casing, or in its immediate vicinity, but in any case at, or substantially at, the same level with the machine so that the head acting on the machine is substantially the same as that acting on the regulator. It will be understood that obviously a regulator of this type must be arranged below the liquid level in which the machine is submerged so that it is in an inconvenient position, particularly in lifting pumps for deep wells.

This drawback is overcome in my invention and the regulator can be arranged anywhere and above ground, if desired, where it is readily accessible for maintenance, adjusting, and repair. Another advantage of this arrangement is that means for indicating the pressure in the machine and the ambiant pressure can readily be provided so that the proper function of the regulator can be ascertained.

Any means, as an open diver's bell, a diaphragm, a piston, or the like may be provided to perform the function of what has above been termed an "air vessel", and it is understood that I am not limited to air nor to any other gas as the pressure or controlling fluid.

In the accompanying drawing, apparatus embodying my invention is illustrated diagrammatically by way of example.

In the drawing

Figs. 1 and 2 illustrate a deep-well pump having a separate and an integral air vessel, respectively, the regulator and the air vessel being shown in section in Fig. 1, Figs. 3 and 4 are modified air vessels shown in axial section.

Referring now to the drawings, and first to Figs. 1 and 2, 1 is a well, 2 is the liquid level in the well, and 3 and 4 is a unit submerged in the well comprising, for instance, an electric motor and a pump. 19 is an air vessel weighted as required and suspended at approximately the same level with the motor 3, and 5 is a pipe connecting the air vessel with a regulator 6.

7 is a diaphragm in the regulator, 8 is a spring exerting pressure on the diaphragm, 9 is a washer for the spring, 10 is a pipe supplying high-pressure fluid to the regulator, 11 is a valve in a cavity of the regulator to which the pipe 10 is connected, 18 is a spring tending to hold the valve 11 on its seat in a partition between the cavity and the chamber above the diaphragm 7, and 12 is a passage connecting the chamber with a pipe 13 which in turn is connected with the casing of the motor 3. 17 is a by-pass pipe connecting the pipes 5 and 10, and 14 and 15 are pressure gauges connected to the pipes 13 and 5, respectively. 16 is a valve for closing the by-pass pipe 17.

The tension of the springs 8 and 18 is regulated by any suitable means, not shown, in conformity with the pressures existing in the plant. Initially, the pressure from the air vessel 19 raises the diaphragm 7 and opens the valve 11 so that the fluid from the pipe 10 is free to flow to the pipe 13 through the passage 12. As pressure builds up in the casing of the motor 3, and consequently in the cavity above the valve 11, the pressure and the load of the spring 18 overcome the pressure below the diaphragm which is consequently depressed against the spring 8, closing the valve 11 and interrupting the fluid supply to the motor 3. When the liquid level 2 rises the increased pressure opens the valve 11 and admits more fluid from the pipe 10, until equilibrium has been reestablished.

The fluid pressure in the motor 3 is indicated at 14, and the pressure in the air vessel 19 is indicated at 15. It may occur that the gas or air in the vessel 19 is gradually dissolved in the liquid so that the gauge 15 ceases to indicate. In this case, the valve 16 in the by-pass pipe 17 is opened for a few seconds to expel the liquid from the vessel 19, and is then closed again.

In this manner the pressure in the motor 3 is regulated conveniently in accordance with the indications of the gauge 14 by adjusting its springs 8 and 18. Instead of a diaphragm, a piston, not shown, might be provided. Leakage or damage at the diaphragm or the piston does not involve any risk to the motor as penetration of liquid into the motor casing cannot occur, and in this respect my novel arrangement compares favourably with that described in my said co-pending application.

Instead of providing a separate air vessel as shown in Fig. 1, I may cast an air vessel 19ª integral with the motor casing, as shown in Fig. 2, or secure a vessel to the motor casing by other means, such as screws.

Dissolving of the air in the vessel 19 or 19ª by the liquid in the vessel is prevented by closing the vessel. This also prevents vapour from the liquid from getting into, and condensing in, the regulator 6.

Examples of vessels of this kind are shown in Figs. 3 and 4. Referring to Fig. 3, 20 is a vessel connected to the pipe 5, and 21 is a diaphragm, of metal or rubber, by which the vessel is closed at the bottom. The diaphragm is deflected more or less in proportion to the pressure exerted by the varying hydrostatic head, causing variations of the pressure in the vessel which are transferred to the diaphragm 7 in the regulator 6, as described. The variations of the pressure in the vessel 20 are not equal to the variations of the hydrostatic pressure but they are proportional to them in accordance with a given law.

Any suitable means, not shown, might be inserted between the vessel and the regulator for transferring the pressure at an increased or reduced rate, as desired.

In the vessel illustrated in Fig. 4, the diaphragm is replaced by a piston 23 which is seated on a shoulder 24 at the base of the vessel. 25 is a port directly above the upper face of the piston when the piston is in its lower end position, and 26 is a check valve by which the ambiant liquid may be connected with the interior of the vessel.

When the vessel 22 is lowered into the liquid in the well the check valve 26 closes under the liquid pressure and becomes inoperative. When the air or gas in the vessel escapes through leakage, the valve 16, Fig. 1, is opened to admit gas under pressure to the vessel 22 and this gas forces the piston down until it is arrested by the shoulder 24. The check valve 26 serves for permitting the pressures inside and outside the vessel 22 to balance. The valve opens under the pressure as soon as the piston 23 has laid open the port 25 and permits the fluid under pressure to escape until equilibrium has been established. The valve then closes automatically.

Instead of a check valve 26, a yielding leather packing or the like might be provided, or any other contrivance permitting the pressures in the pipe 5 and the well 1 to balance without the liquid entering the vessel 22.

By varying the relative position of the motor casing and in particular, its stuffing box, that is, by raising and lowering the air vessel, it is possible to reduce or increase the pressure for which the regulator is set, with respect to the ambiant pressure. Varying the position of the vessel is another expedient for calibrating the regulator, the normal expedient being varying the pressure of the spring 8, or 18, or both.

I claim:

1. A device for controlling the fluid pressure in submerged machines comprising a regulator arranged above the ground and in communication with said machine to supply a fluid thereto; and a vessel submerged adjacent the machine and in fluid communication with said regulator to convey by means of the fluid the pressure of the liquid surrounding the machine directly to the regulator whereby said regulator will maintain a predetermined fluid pressure within the machine.

2. A device for controlling the fluid pressure in submerged machines comprising a regulator arranged above the ground and in communication with said machine; means for supplying a fluid under pressure to the regulator and the machine; and a fluid vessel submerged adjacent the machine and in fluid communication with said regulator to convey by means of the fluid the pressure of the liquid surrounding the machine directly to the regulator whereby said regulator will maintain a predetermined fluid pressure within the machine.

3. A device for controlling the fluid pressure in submerged machines comprising a regulator arranged above the ground and in communication with said machine; means for supplying a fluid under pressure to the regulator and the machine; a fluid vessel submerged adjacent the machine and in communication with said regulator to convey the pressure of the liquid surrounding the machine directly to the regulator whereby said regulator will maintain a predetermined fluid pressure within the machine; and a valve controlled by-pass arranged around said regulator to supply said vessel with fluid.

In testimony whereof, I have signed my name to this specification.

HARRY SAUVEUR.